Jan. 13, 1959 G. B. SEEBERG ET AL 2,868,089
MILLING MACHINE
Filed June 28, 1954 6 Sheets-Sheet 1
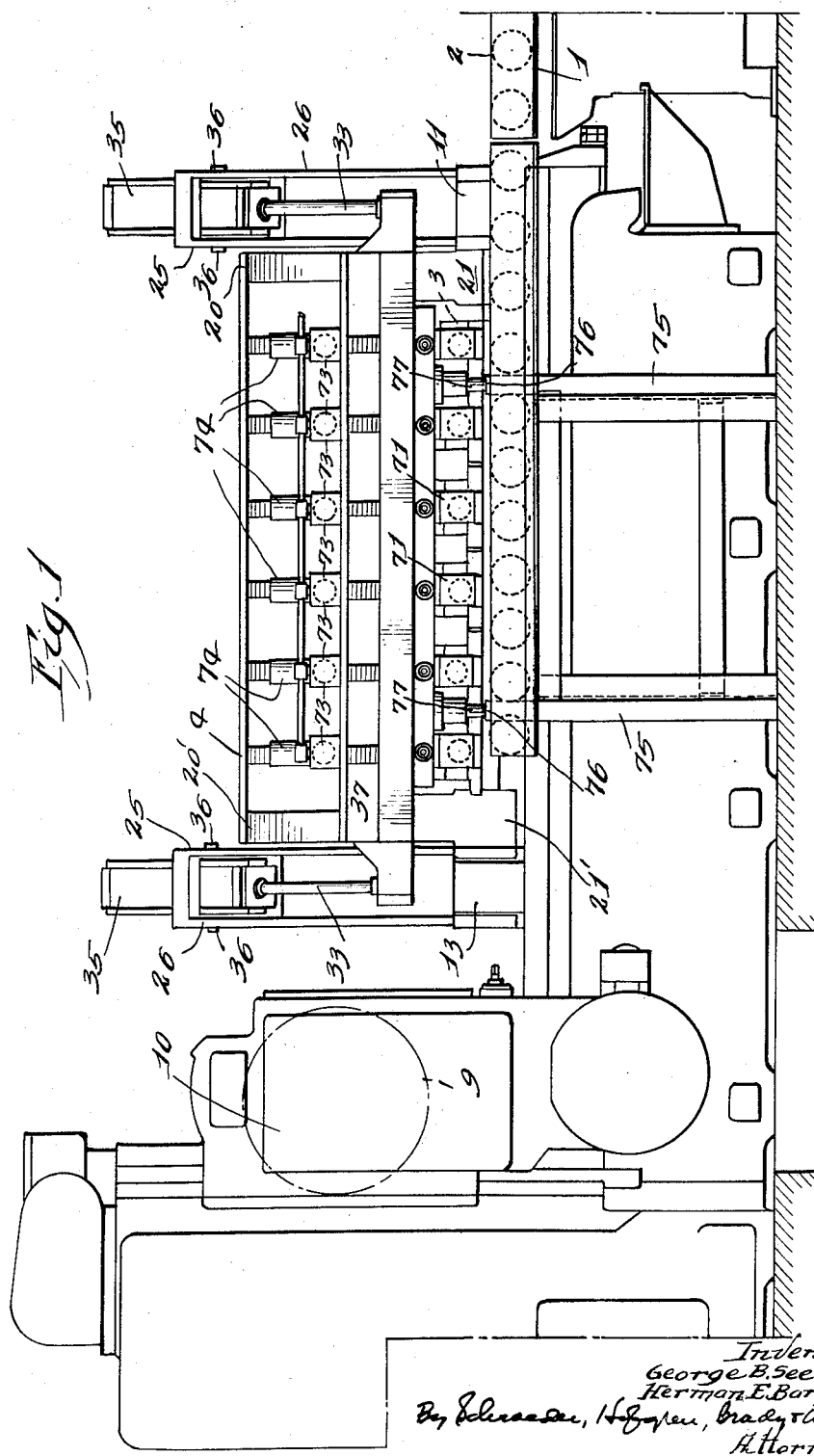
Inventors
George B. Seeberg
Herman E. Bargren
By Schroeder, Hofgren, Brady & Wegner
Attorneys

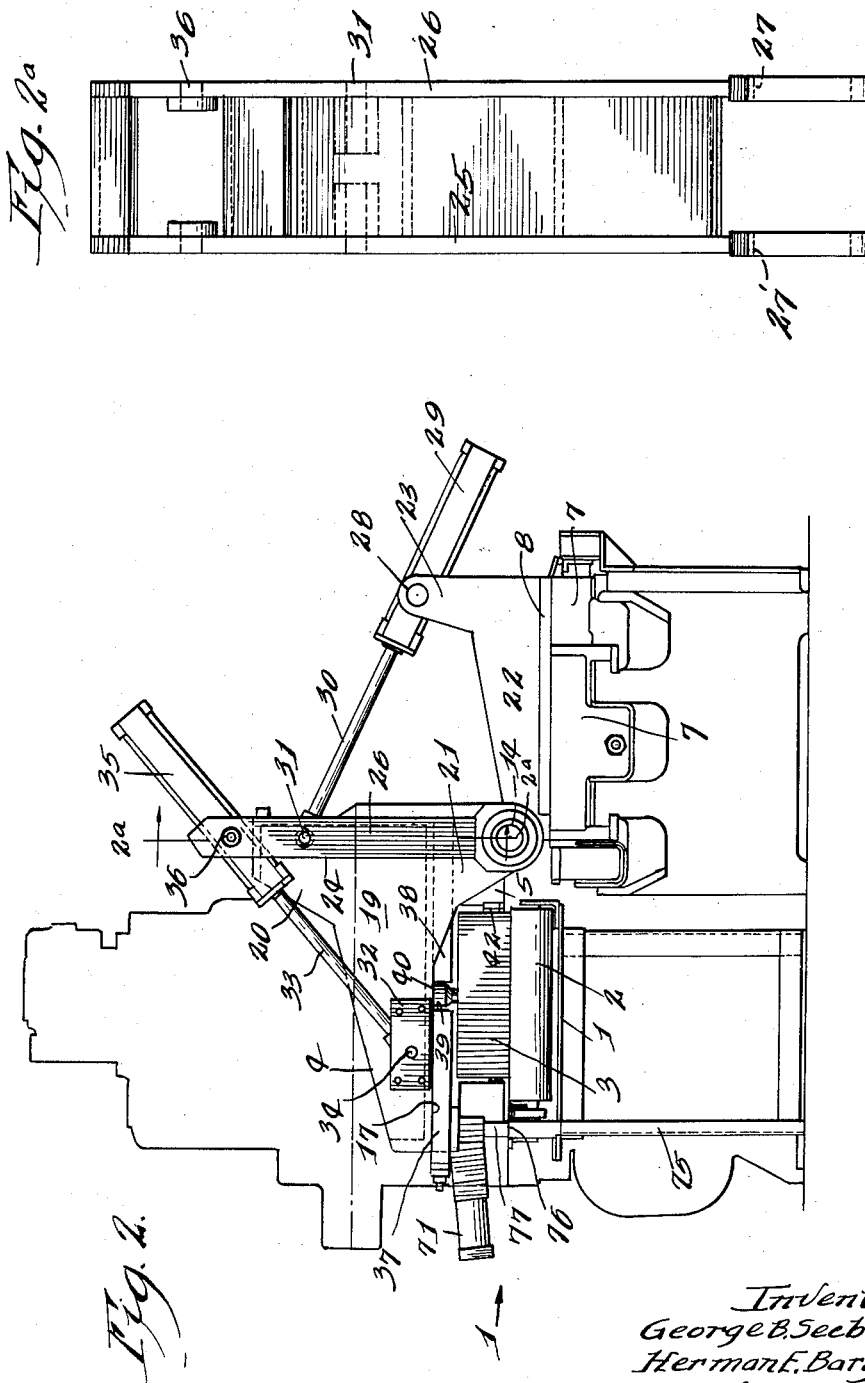

Jan. 13, 1959  G. B. SEEBERG ET AL  2,868,089
MILLING MACHINE
Filed June 28, 1954  6 Sheets-Sheet 3
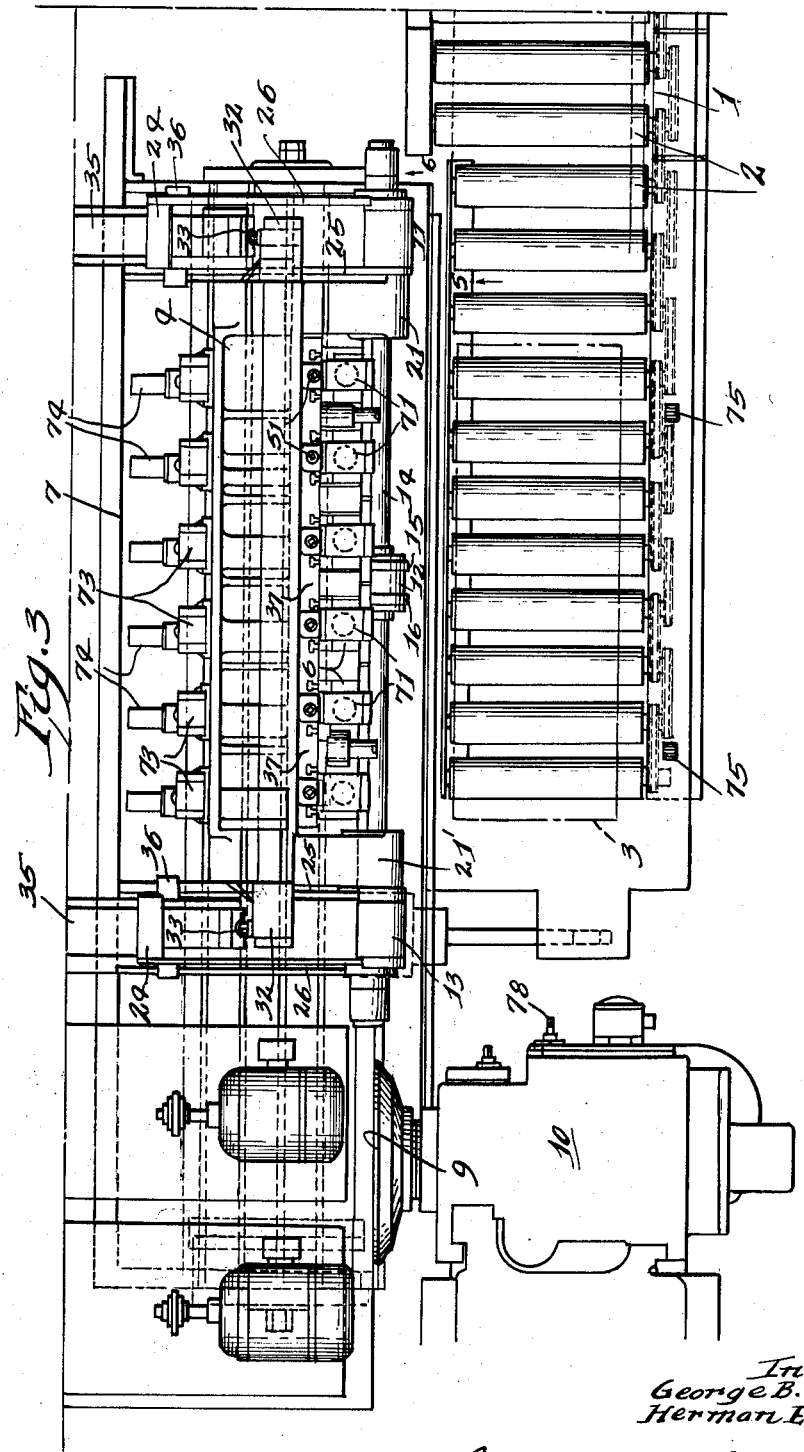
Inventors
George B. Seeberg
Herman E. Bargren
By Schroeder, Hofgren, Brady & Thoeper
Attorneys Jan. 13, 1959 G. B. SEEBERG ET AL 2,868,089
MILLING MACHINE
Filed June 28, 1954 6 Sheets-Sheet 4
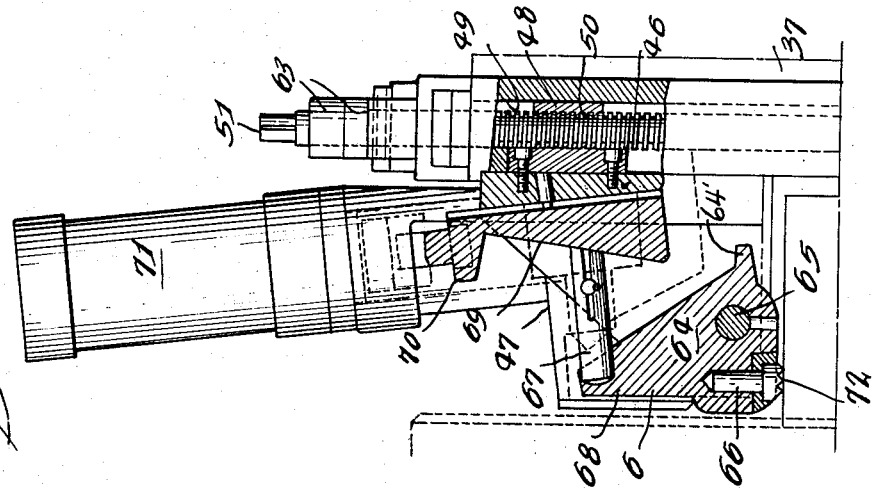
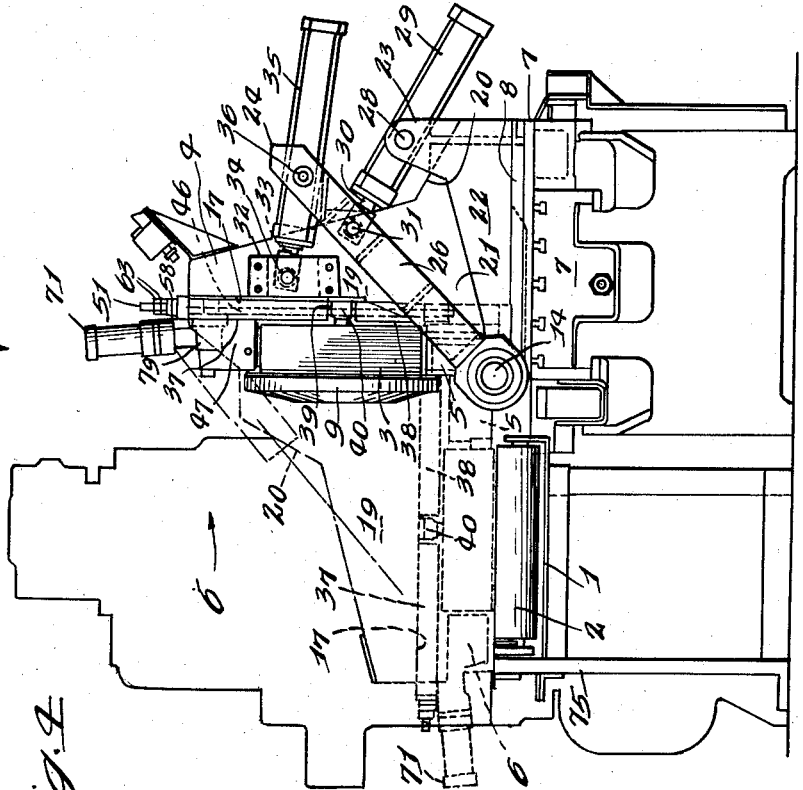
Inventors
George B. Seeberg
Herman E. Bargren
By Schroeder, Hofgren, Brady & Wegner
Attorneys

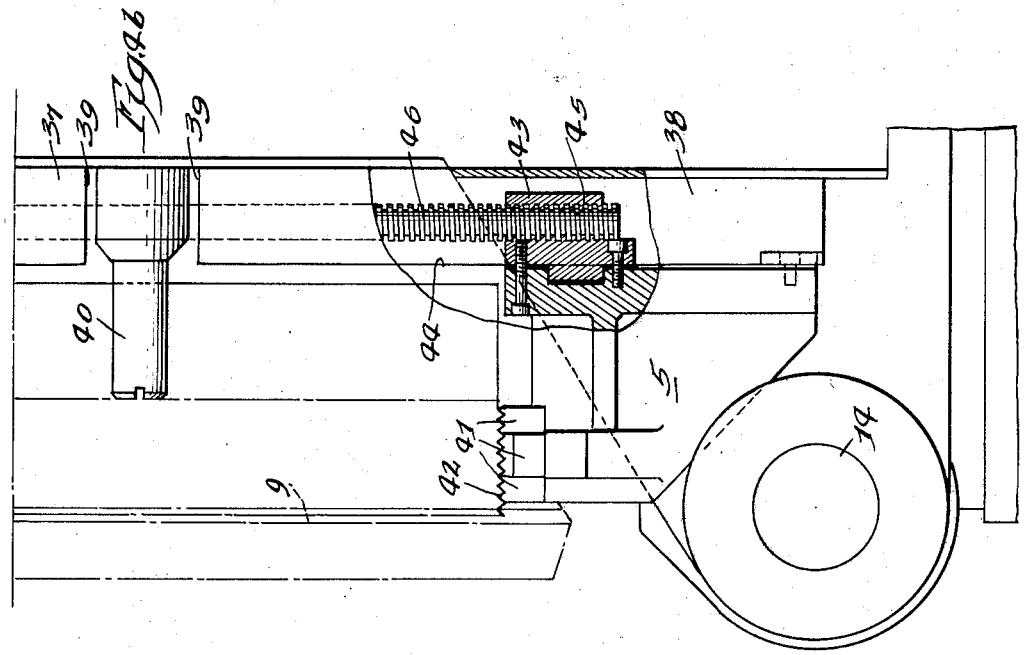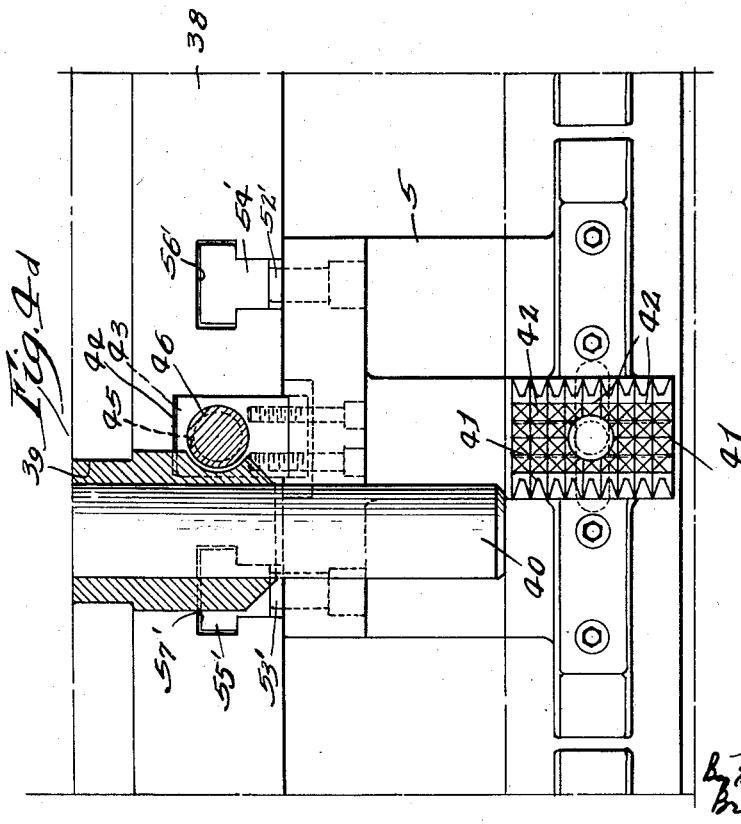

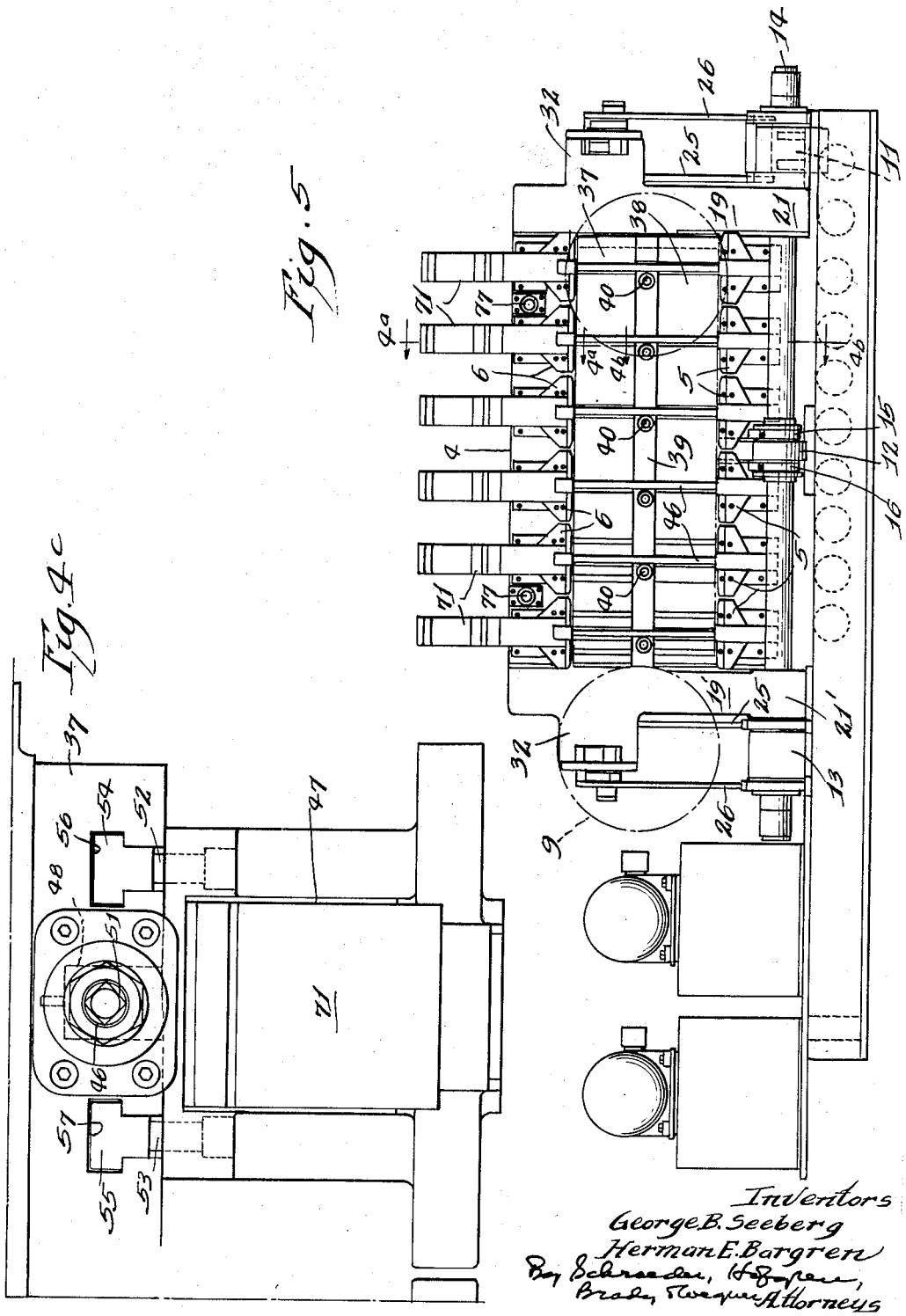

United States Patent Office 2,868,089
Patented Jan. 13, 1959

2,868,089

MILLING MACHINE

George B. Seeberg and Herman E. Bargren, Rockford, Ill., assignors to Sundstrand Machine Tool Co.

Application June 28, 1954, Serial No. 439,738

14 Claims. (Cl. 90—21)

This invention relates to a scalping machine, and more particularly to a scalping machine having novel means for handling and moving a work-piece from a conveyor into milling position, and for enabling, when desired, shifting of the work-piece for one or more additional cuts thereon.

While not limited thereto, the invention will be described herein, for illustrative purposes, as applied to the scalping of copper billets. However, as will be understood, it may be applied to the milling or working of such other work-pieces to which it may be adapted, and which are intended to be included in the terms work-piece or billet. The billet is advanced on a conveyor to a position opposite the handling and moving means which is swung downwardly over the billet, and the billet is clamped at its edges between jaws and has applied along its central portion one or more jacks to prevent flexure of the billet while being worked upon. The handling and moving means is then swung upwardly through two consecutive forty-five degree zones to place the billet edgewise in a vertical position and ready to be advanced across a cutter. Means are provided for adjusting the clamping jaws to accommodate billets of different widths, and are also provided for enabling shifting of the billet after a cut so that an additional cut may be taken on the billet. When one side of the billet has been faced as desired, the billet is returned to the conveyor, released and conveyed to a roll-over device, not shown, turned over from one side to the other, and returned to the handling and moving device for facing on the other side.

Among the objects of the present invention are the following: to provide a novel and improved scalping machine; to provide a novel swingable work holder or fixture for carrying the billet from the conveyor into milling position; to provide a novel arrangement and operation of jaws for clamping the billet in the fixture; to provide means for adjusting the jaws to accommodate the clamping of billets of different widths; to provide means for preventing flexure of the billet during the milling operation; to provide novel means for shifting the billet after a cut so that a further cut may be taken; to provide novel means for swinging the fixture; and to provide novel combinations of parts for carrying into effect the operation of the fixture and its associated parts.

Other objects and advantages will become readily apparent from the following detailed description taken in connection with the accompanying drawings, in which:

Fig. 1 is a front elevation of a scalping machine embodying our invention, showing the work holder or fixture in down or "pick-up" position, and omitting some of the parts for clearness.

Fig. 2 is an end elevation looking toward the right hand end of Fig. 1, some of the parts being added over what is shown in Fig. 1, and others being omitted for the sake of clearness.

Fig. 2a is an enlarged front elevation of the pivot arm for swinging the work holder or fixture, as viewed from the left hand side of Fig. 2.

Fig. 3 is a top plan view of Fig. 1, but showing the work holder or fixture in vertical or cutting position.

Fig. 4 is a view similar to Fig. 2, but showing the work holder or fixture in vertical or cutting position in solid lines, and the fixture frame in down or "pick-up" position in dotted lines.

Fig. 4a is an enlarged transverse vertical section, with parts in elevation, through the center line of one of the upper clamping jaws and the adjusting means for billets of different widths, and taken on the line 4a—4a of Fig. 5.

Fig. 4b is an enlarged view similar to Fig. 4a, but taken through the center line of the lower clamping jaw and adjusting means, on the line 4b—4b of Fig. 5.

Fig. 4c is an enlarged top plan view of one of the upper clamping jaw members showing its slidable connection with the upper clamp mounting plate.

Fig. 4d is an enlarged transverse section through one of the lower clamping jaws showing its slidable connection with the lower clamp mounting plate.

Fig. 5 is a front elevation showing the work holding fixture in vertical or cutting position.

The invention further resides in the combination, construction and arrangement of parts illustrated in the accompanying drawings, and while we have shown therein a preferred embodiment we wish it understood that the same is susceptible of modification and change within the scope of the appended claims.

In the form of the invention shown for illustrative purposes in the drawings, our invention comprises in general a roller conveyor 1 having a series of rollers 2 for conveying a centered and squared billet 3 to a position beneath a work holder fixture 4, which is then in its horizontal position, and which grips the billet between lower clamping jaws 5 and upper clamping jaws 6. The fixture is then swung upwardly and carries the billet into vertical position, and a carriage 7, upon which the fixture is swingably mounted, carries the billet past a milling cutter 9 which removes a desired depth of cut across the width and length of the billet. The carriage with the fixture and billet are then returned to starting position, the fixture swung downwardly to carry the billet into horizontal position, the clamping jaws released, and the billet deposited on the conveyor.

The billet is then conveyed to a roll-over device (not shown), rolled over, and returned to the conveyor where it is again centered and conveyed beneath the fixture or holder which again grips it, swings it to vertical position, and carries it past the cutter for facing the side opposite from the one first faced. The billet is then returned to the conveyor in the manner described above and carried out for desired disposal. If it is desired to take one or more additional cuts across the billet on the same face that has just been cut, the fixture, while the carriage is at the rear end of its stroke, is swung downwardly to put the billet in horizontal position with its lower face the same distance from the tops of the conveyor rollers as the thickness of the just previously made cut. The jaws are then released, the billet dropped onto the rollers, the jaws again gripped against the side edges of the billet, the fixture swung upwardly, and a new cut made of the same thickness as the next preceding cut, as will be later more fully explained.

Referring to Figs. 2 and 4, the fixture base 8 is fixed to the carriage 7 to move therewith as the carriage moves longitudinally past the cutter 9 which is rotatably driven by a conventional motor 10. Fixed to the front edge of the fixture base, one at each end and one in the middle, are three journal bearings 11, 12 and 13, see Fig. 3, within which is mounted a longitudinal shaft 14. A suitable bracket is fixed to the middle portion of the bottom edge of the fixture 4, having a pair of arms 15 and 16 positioned one on each side of the bearing 12, and each provided with a hole to receive and be rotatably mounted on the shaft 14, as seen in Fig. 5. Any suitable number of these journal bearings may be used as desired.

As seen in Fig. 2, the fixture frame 4 is formed with a flat bottom face 17 to which is fixed a pair of clamp mounting plates 37 and 38, later more fully described. Fixture 4 is formed with a plurality of longitudinally spaced strengthening webs extending upwardly, as viewed in Fig. 2, from the bottom plate which carries the bottom face 17, to their upwardly and rearwardly inclined upper edges. The end strengthening web or wall nearest the eye in Fig. 2 is shown at 19, and in addition to the forwardly extending portion it comprises the upwardly extending portion 20 and the downwardly extending arm 21. Arm 21 is formed with a circular opening through which shaft 14 rotatably extends. The opposite end web or wall of the fixture frame is of similar formation and is similarly numbered except to add a prime to the corresponding respective parts. It is thus seen that the fixture frame is rotatably mounted on shaft 14.

Extending to the right from each end of the journal bearing 11, as viewed in Figs. 2 and 4, is an upstanding web 22 formed at its rear end with an upstanding arm 23, thus forming a spaced apart pair of such webs and arms. A similar pair of webs and arms is formed at the opposite end of the fixture base 8 to extend rearwardly from the journal bearing 13. These webs are fixed to the fixture base 8.

The means for effecting and controlling the swinging of the fixture frame to and from horizontal and vertical positions will now be described. Such operating means are located at each end of the fixture frame, and as they are alike at both ends of the frame, only one will be described for brevity. As seen in Figs. 2–5 there is rotatably mounted on shaft 14 an upstanding pivot arm 24 comprising a pair of spaced apart parallel plates 25 and 26, see Fig. 2a, rigidly secured together by cross braces, and each having formed at its lower end an enlarged ear having an opening 27—27' to receive shaft 14 and be rotatable thereon. These apertured ears straddle the two ends of the journal bearing 11 at one end of the fixture frame, and of the journal bearing 13 at the other end of the fixture frame. Pivotally mounted at 28, on the upper end of arm 23, see Fig. 2, is a cylinder 29 having within its bore a piston from which extends a piston rod or plunger 30 pivotally connected at 31 between the side plates of the pivot arm 24.

Fixedly secured to the outer face of the end web 19, adjacent the front end of the fixture frame 4, is a housing 32 having a hollow interior of a size to permit suitable movement of the adjacent end of the plunger 33 which is pivotally connected at its outer end at 34 to the housing 32, and at its other end is connected to a piston within the bore of cylinder 35. Cylinder 35 is pivotally connected at 36 between the side plates of the pivot arm 24 adjacent their upper ends. The two cylinders 29, one at each end of the fixture frame, and the two cylinders 35, one at each end, are connected in suitable circuits, not shown, for operation with pneumatic or hydraulic power as desired. The pair of cylinders 35, when operated, swing the fixture frame through an angle of forty-five degrees upwardly or downwardly depending on the particular operation being executed. The pair of cylinders 29, when operated, swing the pivot arm 24 through an angle of forty-five degrees rearwardly or forwardly depending on the operation being carried out. It will thus be seen that the combined operation of the two pairs of cylinders, either simultaneously or consecutively as desired, will swing the fixture frame through an angle of ninety degrees, to carry the lower face of the billet from a horizontal position to a vertical position, or vice versa, depending upon the particular operation of the cylinders. When the billet is in horizontal position the pivot arm 24 is in vertical position, as shown in Fig. 2. When the billet is in vertical position the pivot arm 24 stands at forty-five degrees to the rear, as shown in Fig. 4.

In order to grasp the billet as it lies on the conveyor rollers, and swing it upwardly into vertical position, the fixture 4 is provided with a series of upper clamping jaws 6, and a series of lower clamping jaws 5. The terms upper and lower, as used herein in connection with the clamping jaws, are used relative to the fixture when standing in a vertical position. Each of the jaws is slidably mounted for adjustment on the clamp mounting plate, which latter is made up of two plates 37 and 38, each firmly bolted to the bottom face 17 of the fixture frame in spaced relation to form the intervening slot 39 extending longitudinally along the center of the fixture frame face. Spaced longitudinally along slot 39 are a suitable number, six being shown for illustration, of jack plungers 40 for supporting the billet against flexing during cutting, as later more fully explained. This arrangement of slot 39 and jack plungers 40, will be understood by reference to Fig. 5.

As seen in Fig. 5 the upper and lower clamping jaws are arranged in pairs, six of such pairs being shown for illustrative purposes. As these pairs are all alike, only one thereof need be described in detail. Referring to Figs. 4b and 4d, the lower clamping jaw 5 is provided in its upper face, at its outer or front end, with any suitable number of blocks 41 having teeth 42 for gripping the lower edge of the billet. Blocks 41 are detachably secured to the body of jaw 5 so that they may be replaced as desired.

The lower clamping jaws 5 are releasably secured to the face of the lower mounting plate 38 by means of headed bolts 52' and 53' passing through the jaw structure 5 and threaded into T-shaped lugs 54' and 55' which are slidable in, but held against rotation in, T-shaped undercut slots 56' and 57' extending vertically of the face of the mounting plate 38. The bolts may be tightened to draw the lugs and secure the clamping jaw or the bolts may be loosened to release the clamping jaw 5 for vertical adjustment.

In order to adjust the clamping jaw vertically, a lug 43 is secured to the rear of the jaw 5 and is received in an open slot 44 extending vertically of the mounting plate between and parallel to the slots 56' and 57'. The lug 43 is provided with a threaded bore 45 which receives the lower portion of a threaded rod 46 rotatably mounted but longitudinally restrained in the upper mounting plate 37 as shown in Figures 4a and 4c. The rod 46 may be rotated by means of a wrench applied to the squared end 51 of the rod to adjust the jaw 5 vertically as it is guided by the lugs 53' and 54' in the T-shaped slots. After adjustment, the rod 46 may be locked by suitable nuts 63.

Referring now to Figs. 4a and 4c, the upper clamping jaw 6 comprises a housing 47 releasably secured to the face of the upper mounting plate 37 in the same manner that lower jaw 5 is mounted, i. e., by means of bolts 52 and 53 threaded in lugs 54 and 55 slidable in slots 56 and 57 aligned with slots 56' and 57' in the lower plate. A rearwardly extending lug 48 is secured to the housing and is received in an open slot 49 aligned with the slot 44 in lower plate 38. The lug 48 is provided with a threaded bore 50 to receive the upper portion of the threaded rod 44. Opposite end portions of the rod 44 are oppositely threaded and lugs 43 and 48 correspondingly threaded so that on rotation of the rod 44, the upper and lower jaws are simultaneously moved toward or away from each other.

The upper and lower clamping jaws, when once adjusted to the width of the billets to be scalped, are clamped in that position with relation to the clamp mounting plates 37 and 38, the distance between these jaws being a little greater than the width of the billet to permit the billet to be readily moved therebetween on the conveyor rolls, when the fixture frame is in horizontal or pick-up position. The means for tightly gripping the billet between the jaws, comprises a swinging jaw member 64, rotatably mounted on a shaft 65 extending cross-wise in the hollow interior of the upper clamping jaw housing 47, as seen in Fig. 4a. Swinging jaw member 64 has replaceably mounted in the forward lower face portion, as viewed in Fig. 4a, a toothed member 66, the toothed portion of which is movable against and away from the adjacent edge of the billet through an opening in the bottom of the housing. This movement of the toothed member 66 to and away from the adjacent edge of the billet is effected by the pushing action of a sturdy pin 67 against the upstanding arm 68 of the swinging jaw member 64. Longitudinal movement of pin 67 is effected by an inclined cam surface 69 formed on plunger 70 fixed to a piston movable in cylinder 71 which is fixed to housing 47. The rear end of push pin 67 where it contacts plunger 70 is inclined in the same direction and at the same angle as the cam surface 69 so as to have sliding contact therewith to push pin 67 forwardly to force the teeth 72 of toothed member 66 against the edge of the billet when the piston in cylinder 71 is operated to move the plunger 70 outwardly or to the left as viewed in Fig. 2. The other set of jaws at the other edge of the billet are at this time stationary, and the billet will be forced thereagainst by the gripping action of the toothed member 66. When it is desired to release the billet after it has been milled, the piston in cylinder 71 will be moved in the opposite direction to move the plunger 70 inwardly to release pin 67. The pin 67 will then be moved inwardly by the jaw member 64 when the jaw plunger 70 strikes a lug 64' on the jaw member to free the teeth of toothed member 66 from the billet, and to release the billet from the jaws. Any suitable conduit system and control members may be used for operating the cylinders of the upper jaws 6 pneumatically, hydraulically, or by other power medium as desired.

Referring to Figs. 2, 3, 4 and 5, six, or any other desired number, of jack plungers are mounted at spaced intervals longitudinally along the slot 39 formed between the adjacent edges of the upper and lower clamp mounting plates 37 and 38, and capable of being set to have their free ends abut against the mid-positions of the rear face of the billet and be rigidly held in that position to prevent any deflection of the billet during the cutting operation. These jack plungers, which extend through the fixture frame, are spring pressed, and after the clamps are set to hold the work, piston and cylinder devices operate suitable intermediate cam connections to firmly hold the jack plungers against the work to prevent any deflection thereof. The jack cylinders are shown at 73, and the jack plunger casings at 74, in Fig. 3. As no claims are being made to the locking means per se in these jacks, it will be unnecessary to describe them in detail, other than as back-up jacks in combination with the other operating parts of the fixture.

As seen in Figs. 1 and 2, a pair of stop bars 75 are provided, spaced longitudinally of the conveyor under the outer side edge thereof, to be one under each of the front end corners of the outer clamp mounting plate 37 when the fixture frame is in horizontal position. As shown in Fig. 1, the upper end 76 of each of these stop bars extends a slight distance above the top plate of the conveyor outer side edge. Mounted by bolts, studs, or other suitable fastening means, to the under face of the clamp mounting plate 37, one adjacent each of the front corners thereof, is a pair of stop plungers 77, so positioned and of such length that when the fixture frame is swung to horizontal position the lower ends of these stop plungers will contact and rest upon the upper ends 76 of the stop bars 75. This means that when the fixture frame is swung downwardly it will always stop in the same horizontal position. Hence, after a cut has been taken from one face of the billet, and the fixture carriage 7 returned to its original position, the fixture frame may be swung to horizontal position, the clamping jaws released from the billet, the billet dropped onto the conveyor rollers, the clamping jaws again gripped onto the billet, the fixture frame swung to vertical position, and another cut taken on the same face of the billet of the same thickness as the first cut. This may be repeated as many times as desired, if such additional cuts are required, each of such additional cuts being of the same thickness. If it is desired to make a cut of different thickness, the same can be accomplished by horizontal adjustment, in a conventional manner, of the cutter quill by rotation of the adjusting head 78, see Fig. 3.

The conveyor rollers at the pick-up end of the conveyor form a table from which the work-piece is picked up by the work holder, and the support for pivotally mounting the work holder or fixture is a travelling carriage for carrying the work-pieces across a cutter for a cutting operation after the fixture, with the work-piece clamped therein, has been swung from horizontal to vertical position.

We claim:

1. A scalping machine comprising: a work support for supporting a workpiece in position to be picked up, a fixture support adjacent said work support, a work holding fixture swingably mounted on said fixture support for selective movement from a horizontal first position over a workpiece on said work support at the pickup position to a second position in which a workpiece held by said work holding fixture is tilted to a position exposing the bottom surface of said workpiece for machining while held by said fixture, means on said work holding fixture for clamping a workpiece thereon, and cylinder and plunger means connected between said fixture support and said work holding fixture for swinging said fixture to and from said first and second positions.

2. In a scalping machine, in combination, a conveyor having means for supporting a workpiece in position to be picked up, a support positioned alongside said conveyor at the pickup position, a work holding fixture swingably mounted on said support for movement from a substantially horizontal position over a workpiece on said conveyor at said pickup position to a vertical position, gripping means on said work holding fixture for gripping a workpiece at said pickup position and for holding said workpiece during movement of said work holding fixture to said vertical position so that said workpiece is moved to a position tilting the bottom surface of said workpiece to an exposed vertical position for machining while held in said fixture, and cooperating means on said conveyor and on said fixture for stopping said fixture in the same horizontal position aforesaid each time it is swung thereto, whereby after a first machining operation, additional machining may be accomplished by releasing and again gripping said workpiece in horizontal position over said conveyor.

3. In a scalping machine, in combination, a work support for supporting a billet in pickup position, a longitudinally movable carriage alongside said work support at said pickup position, a work holding fixture pivotally mounted on said carriage for lateral swinging movement thereon from a horizontal position over a billet on said work support at said pickup position to a vertical position over said carriage, means for swinging said fixture from said horizontal position to said vertical position, gripping means on said work holding fixture for engaging vertical surfaces on said billet to grip said billet when said fixture is in said horizontal position and to hold said billet during movement of said fixture from said horizontal to said vertical position to effect movement of said billet to a position tilting the bottom surface thereof to an exposed vertical position for a scalping operation while held in said fixture, a cutter, means for moving said carriage past said cutter for scalping said bottom surface of said billet while held by said fixture in said vertical position, a stationary stop bar on said work support at said pickup position, and stop means on said work holding fixture to contact said stop bar when said fixture moves down to pickup position to insure that the pickup position of said fixture is always the same, whereby when said gripping means is released said billet will fall onto said work support and can again be gripped for a cut of the same depth as the preceding cut.

4. In combination in a work handling and cutting machine; a conveyor having means for supporting a workpiece at a pickup position; a movable carriage alongside said conveyor at said pickup position; a cutting station alongside the path of said carriage at the same side of said carriage as said work supporting means and past which said carriage is movable; a fixture frame swingably mounted on said carriage for lateral swinging between a horizontal position over a workpiece at said pickup position and a vertical position over said carriage; means on said fixture frame for clamping said workpiece thereto when said fixture frame is in said horizontal position comprising opposed jaws having surfaces extending vertically when said fixture frame is in said horizontal position to engage opposite vertically extending surfaces on said workpiece, one of said jaws being mounted for movement toward said other to clamp the workpiece therebetween; means for swinging said fixture frame between said horizontal and vertical positions to tilt the bottom horizontally extending surface of said workpiece on the conveyor to an exposed vertical position for cutting while held on said fixture frame; a stop bar on said conveyor; and a stop plunger on said fixture frame in position to engage said stop bar when said fixture frame is moved toward said horizontal position to always stop said fixture frame in a pre-determined horizontal position relative to said work supporting means in order to establish the position of said fixture for clamping the workpiece thereon, whereby when said fixture is moved to said vertical position said workpiece is positioned for taking a pre-determined depth of cut, and whereby said workpiece may be released over said pickup position after one cutting operation to drop onto said work supporting means and be regripped for a second cut of the same depth as the first.

5. A scalping machine comprising: a work support for supporting a workpiece in position to be picked up, a base adjacent said work support, a work holding fixture swingably mounted on said base for selective movement from a horizontal first position over a workpiece on the work support at the pickup position to a second vertical position in which said workpiece held by said work holding fixture is tilted to a vertical position exposing the bottom surface of said workpiece for machining while held by said fixture, means on said work holding fixture for clamping said workpiece thereon, and cylinder and plunger means connected between said base and said work holding fixture for swinging said fixture to and from said first and second positions, comprising two piston and cylinder devices, the first device of said devices being pivotally connected to said base and the second device of said devices being pivotally connected to said fixture, and means interconnecting said first device and second device for effecting bodily movement of the second device and pivotal movement of the fixture through a 45° angle from said vertical position on actuation of said first device and for effecting pivotal movement of said fixture through an additional 45° angle to said horizontal position on actuation of said second device.

6. In a scalping machine, in combination, a work support of supporting a billet in pickup position, a longitudinally movable carriage alongside said work support at said pickup position, a work holding fixture pivotally mounted on said carriage for lateral swinging movement thereon from a horizontal position over a billet at said pickup position on said work support to a vertical position over said carriage, means for swinging said fixture from said horizontal to said vertical position, gripping means on said work holding fixture for gripping said billet when said fixture is in said horizontal position and for holding said billet during movement of said fixture from the horizontal to said vertical position to effect movement of said billet to a position tilting the bottom surface thereof to an exposed vertical position for a scalping operation while held in said fixture, a cutter, means for moving said carriage past said cutter for scalping said bottom surface of the billet while held by said fixture in said vertical position, and cooperating stop means on the work support and on the work holding fixture engageable when said fixture moves down to said pickup position to insure that said pickup position of the fixture is always the same, whereby when said gripping means is released said billet will fall onto said work support and can again be gripped for a cut of the same depth as the preceding cut, said means for swinging said work holding fixture comprising, a pivot arm swingably mounted on said carriage, first piston and cylinder means connected between said pivot arm and said carriage for swinging said pivot arm through a first 45° angle, and second piston and cylinder means connected between said pivot arm and said fixture for swinging said fixture through an additional 45° angle.

7. In combination in a work handling machine, a conveyor for conveying a workpiece into pickup position, a movable carriage alongside said pickup position of said conveyor, a fixture frame swingably mounted on said carriage for swinging between a horizontal position over said pickup position and a vertical position, means on said fixture frame for gripping a workpiece in pickup position when said fixture frame is in said horizontal position, means for swinging said fixture frame to and from said horizontal position and said vertical position, said means for swinging said frame including a pivot arm swingably mounted on said carriage, power means connected between said pivot arm and said carriage for swinging said pivot arm comprising a piston and cylinder device having its cylinder pivotally mounted on said carriage and its piston rod pivotally connected to said pivot arm, and power means connected between said pivot arm and said fixture frame for swinging said fixture frame with relation to said pivot arm comprising a second piston and cylinder device having its cylinder pivotally mounted on said pivot arm and its piston rod pivotally connected to said fixture frame, said pivot arm standing vertical when said frame is in said horizontal position and forty-five degrees to the rear when said frame is in said vertical position.

8. In combination in a work handling and cutting machine having a frame, a work holding fixture pivotally supported on said frame for lateral swinging movement thereon between horizontal and vertical positions, means on said fixture for gripping a workpiece when said fixture is in said horizontal position, and piston and cylinder means for swinging said fixture between said horizontal and vertical positions comprising two piston and cylinder devices, the first device of said devices being pivotally connected to said frame and the second device of said devices being pivotally connected to said fixture, and means interconnecting said first device to the second device for effecting bodily movement of said second device and pivotal movement of said fixture through a 45° angle from said vertical position on actuation of said first device and for effecting pivotal movement of said fixture through an additional 45° angle to said horizontal position on actuation of said second device.

9. In combination in a work handling and cutting machine having a frame, a work holding fixture pivotally supported on said frame for lateral swinging movement thereon between horizontal and vertical positions, means on said fixture for gripping a workpiece when said fixture is in said horizontal position, means on said fixture for supporting said workpiece against flexure during a cutting operation, means for stopping said fixture in identically the same horizontal position each time it is swung from said vertical position to said horizontal position, and piston and cylinder means for swinging said fixture between said horizontal and vertical positions comprising two piston and cylinder devices, the first device of said devices being pivotally connected to said fixture and the second device of said devices being pivotally connected to said frame, and means interconnecting said first device and said second device for effecting pivotal movement of said fixture through a 45° angle from said horizontal position on actuation of said first device and for effecting bodily movement of said first device and pivotal movement of said fixture through an additional 45° angle to said vertical position on actuation of said second device.

10. A scalping machine, comprising: a conveyor, a movable carriage laterally offset from said conveyor but positioned alongside thereof, a fixture frame pivotally mounted on said carriage for lateral swinging movement thereon, a pivot arm pivotally mounted on said carriage for lateral swinging movement thereon, a first cylinder and plunger connected between said carriage and said pivot arm, and a second cylinder and plunger connected between said pivot arm and said fixture frame, whereby said fixture frame may be swung part way by one said cylinder and plunger, and through the balance of its movement by said other cylinder and plunger.

11. A scalping machine comprising: a conveyor, a movable carriage laterally offset from said conveyor but positioned along side thereof, a fixture frame pivotally mounted on said carriage for lateral swinging movement thereon, a pivot arm pivotally mounted on said carriage for lateral swinging movements thereon, a first cylinder and plunger connected between said carriage and said pivot arm, and a second cylinder and plunger connected between said pivot arm and said fixture frame, whereby said fixture frame may be swung part way by one said cylinder and plunger, and through the balance of its movement by said other cylinder and plunger, said first cylinder and plunger comprising a cylinder pivotally mounted on said carriage and a plunger having its free end pivotally connected to said pivot arm, and said second cylinder and plunger comprising a cylinder pivotally mounted on said pivot arm and a plunger having its free end pivotally connected to said fixture frame.

12. In combination in a work handling and cutting machine having a frame, a work holding fixture pivotally supported on said frame for lateral swinging movement thereon between a forward horizontal position and a rearward vertical position, means on said fixture for gripping a workpiece when said fixture is in said horizontal position, a lever mounted on said frame for pivotal movement about the pivot axis of said fixture, said lever extending upwardly from said pivot axis, an upright positioned on said frame rearwardly of said work holding fixture, a first piston and cylinder device including a cylinder having a mid-portion pivotally mounted on said upright and a forwardly extending piston rod having its free end pivotally connected to a mid-portion of said lever, a second piston and cylinder device including a cylinder having a mid-portion pivotally mounted on the free end of said lever and a forwardly extending piston rod having its free end pivotally connected to said fixture, said lever having a vertical position when said fixture is in said horizontal position and a position 45° to the rear from vertical when said fixture is in said vertical position, whereby said piston and cylinder devices are connected to effect pivotal movement of said fixture through successive 45° angles between said horizontal and vertical positions, the arrangement being such that said first piston and cylinder device effects pivotal movement of said lever through a 45° angle, bodily movement of said second piston and cylinder device through a 45° angle, and pivotal movement of said fixture through a 45° angle, and said second piston and cylinder device effects pivotal movement of said fixture through a 45° angle relative to said lever.

13. A work handling machine comprising: a work support, a base alongside said work support, a fixture frame pivotally mounted on said base for lateral swinging movement to and from a position over said work support, said frame having a series of fixed clamping jaws and a series of movable clamping jaws constituting a plurality of sets of jaws each set including one of said fixed jaws and one of said movable jaws, each of said movable clamping jaws comprising a pivoted gripping member movable toward and away from said associated fixed clamping jaw, and means for actuating said pivoted gripping member including a piston and cylinder device, a wedge shaped actuator connected to said piston and cylinder device for reciprocal movement thereby, a reciprocal pin having one end bearing against said pivoted gripping member and its other end bearing against said wedge shaped actuator for moving said gripping member in a gripping direction on movement of said wedge shaped actuator in one direction, and an abutment on said pivoted gripping member engageable by said wedge shaped actuator on movement in the opposite direction for pivoting said gripping member in a releasing direction.

14. In a work handling machine having a work holding fixture, means for clamping a workpiece to said fixture, comprising, a fixed clamping jaw, a movable clamping jaw comprising a pivoted gripping member having a work engaging portion movable toward and away from said fixed clamping jaw on pivotal movement of said gripping member in opposite directions, and means for actuating said gripping member including a piston and cylinder device, a wedge shaped actuator, slidably mounted and having one end connected to said piston of said device for movement thereby in opposite directions, said actuator having a cam surface inclined to its path of movement, a longitudinally movable actuating pin having one end bearing against said pivoted gripping member at one side of its pivot axis and one end bearing against said inclined cam surface of said actuator for effecting pivotal movement of said gripping member in a work gripping direction on movement of said actuator in one direction, and an abutment on said pivoted gripping member offset from said pivot axis and spaced from said actuator when said actuator and gripping member are in work gripping position, and positioned to be struck by said actuator on movement in a return direction for moving said gripping member in a work releasing direction.

References Cited in the file of this patent

UNITED STATES PATENTS

| | | |
|---|---|---|
| 1,973,801 | Dustan | Sept. 18, 1934 |
| 2,142,735 | Rougemont | Jan. 3, 1939 |
| 2,365,987 | Zimmerman | Dec. 26, 1944 |
| 2,413,781 | Pond | Jan. 7, 1947 |
| 2,542,986 | Bowen | Feb. 27, 1951 |
| 2,577,766 | Johnson et al. | Dec. 11, 1951 |
| 2,664,790 | Strachan | Jan. 5, 1954 |

FOREIGN PATENTS

| | | |
|---|---|---|
| 451,049 | Great Britain | July 29, 1936 |
| 512,082 | Germany | Nov. 6, 1930 |